United States Patent
Pihl et al.

(10) Patent No.: US 11,477,459 B2
(45) Date of Patent: Oct. 18, 2022

(54) IMAGE PROCESSING DEVICE, A CAMERA AND A METHOD FOR ENCODING A SEQUENCE OF VIDEO IMAGES

(71) Applicant: Axis AB, Lund (SE)

(72) Inventors: Fredrik Pihl, Lund (SE); Mats Lund, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/488,349

(22) Filed: Sep. 29, 2021

(65) Prior Publication Data

US 2022/0116625 A1    Apr. 14, 2022

(30) Foreign Application Priority Data

Oct. 13, 2020    (EP) .................................... 20201591

(51) Int. Cl.
*H04N 19/146*    (2014.01)
*H04N 19/103*    (2014.01)
(Continued)

(52) U.S. Cl.
CPC ............ *H04N 19/146* (2014.11); *H04N 7/183* (2013.01); *H04N 19/103* (2014.11); *H04N 19/172* (2014.11); *H04N 19/176* (2014.11)

(58) Field of Classification Search
CPC .. H04N 19/103; H04N 19/132; H04N 19/134; H04N 19/146; H04N 19/162;
(Continued)

(56) References Cited

U.S. PATENT DOCUMENTS

2002/0080878 A1    6/2002    Li
2007/0230575 A1*   10/2007   Han .................... H04N 19/187
                                                     375/E7.199
(Continued)

FOREIGN PATENT DOCUMENTS

CA    2805916 A1    4/2007
EP    3151562 A1    4/2017
(Continued)

OTHER PUBLICATIONS

Schwarz et al., "Overview of the Scalable Video Coding Extension of the H.264/AVC Standard", IEEE Transactions on Circuits and Systems for Video Technology, XP055378169, vol. 17, No. 9, Sep. 1, 2007, pp. 1103-1120.

*Primary Examiner* — Jessica M Prince
(74) *Attorney, Agent, or Firm* — Xsensus LLP

(57) ABSTRACT

An image processing device, a camera and a method of encoding a sequence of video images into a single video stream with dynamic bitrate are provided. The sequence of video images is encoded into frames of a base layer of the single video stream using a base layer resolution and a base layer compression level. Video images of the sequence of video images corresponding to respective times before detecting an event trigger are encoded into a first set of frames of an extended layer of the single video stream. The event trigger is detected and upon detecting the event trigger, video images of the sequence of video images corresponding to respective times after detecting the event trigger are encoded into a second set of frames of the extended layer using a higher resolution than the base layer resolution or a lower compression level than the base layer compression level.

8 Claims, 3 Drawing Sheets

(51) Int. Cl.
*H04N 19/172* (2014.01)
*H04N 19/176* (2014.01)
*H04N 7/18* (2006.01)

(58) Field of Classification Search
CPC .. H04N 19/164; H04N 19/172; H04N 19/176; H04N 19/187; H04N 19/31; H04N 19/40; H04N 21/234327; H04N 21/2662; H04N 5/77; H04N 7/18; H04N 7/183; H04N 9/8042
See application file for complete search history.

(56) References Cited

U.S. PATENT DOCUMENTS

| | | | | |
|---|---|---|---|---|
| 2016/0073113 A1* | 3/2016 | Rintaluoma | ............ | H04N 19/15 375/240.12 |
| 2017/0302977 A1* | 10/2017 | Lallet | ................ | H04N 21/2146 |
| 2020/0077105 A1* | 3/2020 | Hannuksela | ......... | H04N 19/172 |
| 2021/0090413 A1* | 3/2021 | Nystrom | .............. | H04N 19/109 |

FOREIGN PATENT DOCUMENTS

| | | |
|---|---|---|
| EP | 3499880 A1 | 6/2019 |
| GB | 2552376 A | 1/2018 |
| WO | 2016/108188 A1 | 7/2016 |

* cited by examiner

IMAGE PROCESSING DEVICE, A CAMERA AND A METHOD FOR ENCODING A SEQUENCE OF VIDEO IMAGES

CROSS-REFERENCE TO RELATED APPLICATION

This application claims priority to European Patent Application No. 20201591.3, filed on Oct. 13, 2020, the entire disclosure of which is incorporated by reference herein.

TECHNICAL FIELD

The present invention relates to video encoding, and specifically to encoding a sequence of video images into a single video stream with dynamic bitrate.

BACKGROUND

For cameras used for monitoring or surveillance, the bitrate of an encoded sequence of video images may be a limiting factor, e.g. when the encoded sequence of video images is to be transmitted and/or stored. At the same time, the encoded sequence of video images may later be used as forensic evidence and therefore as much details as possible should be maintained in the encoded sequence of video images.

SUMMARY OF THE INVENTION

An object of the present invention is to facilitate bitrate savings for a video stream generated by a camera.

According to a first aspect a method of encoding a sequence of video images into a single video stream with dynamic bitrate is provided. In the method the sequence of video images is encoded into frames of a base layer of the single video stream using a base layer resolution and a base layer compression level. Video images of the sequence of video images corresponding to respective times before detecting an event trigger are encoded into a first set of frames of an extended layer of the single video stream. The frames of the first set of frames are empty frames irrespective of the encoding of the corresponding frames of the base layer. The event trigger is detected and upon detecting the event trigger, video images of the sequence of video images corresponding to respective times after detecting the event trigger are encoded into a second set of frames of the extended layer using a higher resolution than the base layer resolution or a lower compression level than the base layer compression level.

By an event trigger is meant a trigger that indicates that an event is occurring or is about to occur which may become of interest and hence, that the sequence of video images captured after the event trigger may include information that will be of more interest than the sequence of video images captured before the event trigger.

By detecting the event trigger, it is possible to adapt the encoding of images of the sequence of video images such that encoded video images relating to a time before detection of the event trigger have a reduced bitrate and encoded video images relating to a time after the detection of the event trigger have a higher resolution or lower compression level.

An empty frame is here intended to denote an encoded frame that includes little or no additional information to the information provided in an encoded frame on which the empty frame depends. For example, an empty frame of the extended layer is an encoded frame which includes little or no additional information to the information provided in a corresponding encoded frame of the base layer. By having little or preferably no additional information to the corresponding encoded frames of the base layer, empty frames of the extended layer will require few or a minimal number of bits.

By encoding images of the sequence of video images corresponding to respective times before detecting the event trigger into empty frames of the extended layer irrespective of the encoding of the corresponding frames of the base layer, bitrate can be reduced. For an image encoded into a non-empty frame of the base layer, encoding the image into an empty frame of the extended layer irrespective of the encoding of the non-empty frame of the base layer requires fewer bits than would have been required if the encoding of the frame of the base layer would have been taken into account. For the latter case, i.e. when the encoding of the frame of the base layer would have been taken into account, the image would have been encoded into a non-empty frame of the extended layer also which would have required more bits.

The empty frames of the first set of frames may be frames which have been encoded using skip blocks for a majority of blocks of each of the frames.

The empty frames of the first set of frames may be frames which have been encoded using skip blocks for all of blocks of each of the frames.

A skip block is a block for which no image information is sent to the decoder; only an indication that the block is a skip block. On a decoder side, a skip block of a frame of the extended layer will be identified and indicate that no additional information is provided for enhancement in relation to a corresponding block of a corresponding frame of the base layer. A block is a group of pixels which may also be denoted block or macroblocks, or coding tree units depending on the encoding format used.

The frames of the second set of frames of the extended layer are inter frames encoded using prediction dependent on corresponding frames of the base layer.

According to a second aspect a method of transmitting a sequence of video images with dynamic bitrate is provided. In the method of the second aspect the sequence of video images are encoded according to the method of the first aspect. The single video stream is then transmitted, wherein the first set of frames are prevented from being transmitted.

According to a third aspect, a non-transitory computer readable storage medium is provided. The non-transitory computer readable storage medium has stored thereon instructions for implementing the method according to the first aspect or the method according to the second aspect, when executed on a device having processing capabilities.

According to a fourth aspect, an image processing device for encoding a sequence of video images into a single video stream with dynamic bitrate is provided. The image processing device comprises an encoder configured to execute a base layer encoding function and an extended layer encoding function. The base layer encoding function is configured to encode the sequence of video images into frames of a base layer of the single video stream using a base layer resolution and a base compression level. The extended layer encoding function is configured to encode the sequence of video images into frames of an extended layer of the single video stream. The image processing device further comprises circuitry configured to execute a pre-event instructing function, an event trigger detecting function, and a post-event instructing function. The pre-event instructing function is configured to instruct the encoder to encode video images of the sequence of video images corresponding to respective times before detecting an event trigger into a first set of frames of the extended layer of the single video stream, wherein the frames of the first set of frames are empty frames irrespective of the encoding of the corresponding frames of the base layer. The event trigger detecting function is configured to detect the event trigger. The post-event instructing function is configured to, upon detecting the event trigger, instruct the encoder to encode video images of the sequence of video images corresponding to respective times after detecting the event trigger into a second set of frames of the extended layer using a higher resolution than the base layer resolution or a lower compression level than the base layer compression level.

The empty frames of the first set of frames may be frames which have been encoded using skip blocks for a majority of blocks of each of the frames.

The empty frames of the first set of frames may be frames which have been encoded using skip blocks for all of blocks of each of the frames.

The frames of the second set of frames of the extended layer are inter frames encoded using prediction dependent on corresponding frames of the base layer.

According to a fifth aspect, a camera comprising the image processing device of the fourth aspect is provided.

The camera may further comprise a transmitter configured to transmit the single video stream. The circuitry of the image processing device may be further configured to execute a pre-event transmission prevention function. The pre-event transmission prevention function is configured to prevent the transmitter from transmitting the first set of frames.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and to convey the scope of the invention to the skilled person.

Figure 1:
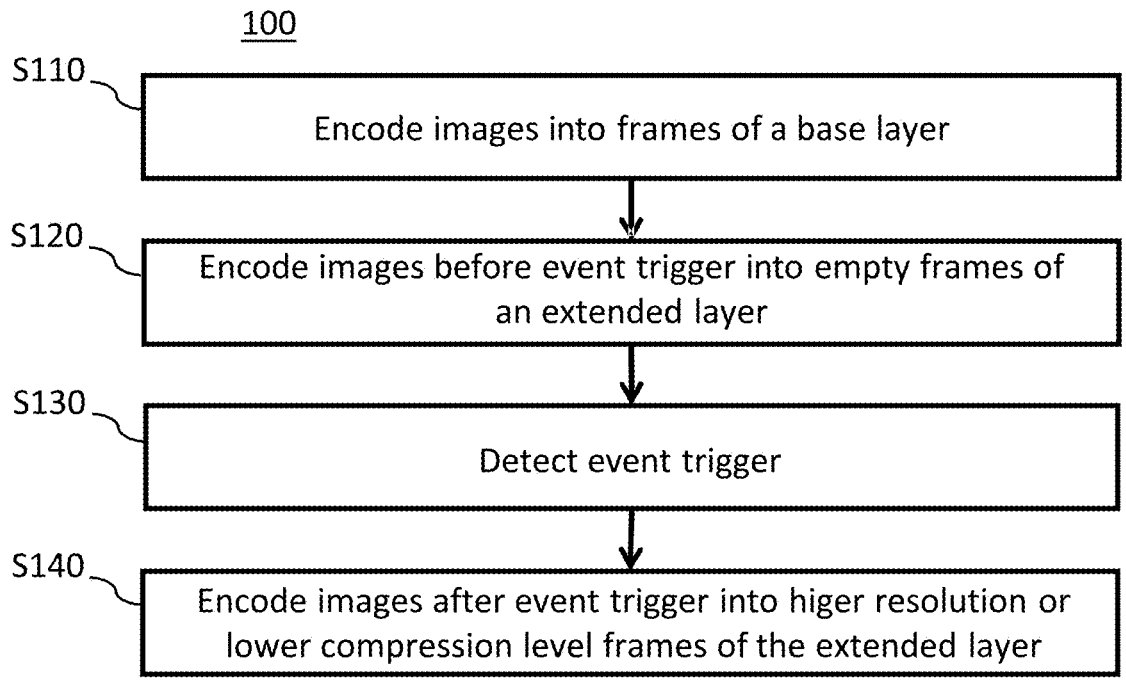
FIG. 1 is a flow chart of embodiments of a method for encoding a sequence of video images into a single video stream with dynamic bitrate.

FIG. 1 is a flow chart of embodiments of a method 100 of encoding a sequence of video images into a single video stream with dynamic bitrate. In the method the sequence of video images is encoded S110 into frames of a base layer of the single video stream using a base layer resolution and a base layer compression level. Video images of the sequence of video images corresponding to respective times before detecting an event trigger are encoded S120 into a first set of frames of an extended layer of the single video stream. The frames of the first set of frames are empty frames irrespective of the encoding of the corresponding frames of the base layer. The event trigger is detected S130 and upon detecting the event trigger, video images of the sequence of video images corresponding to respective times after detecting the event trigger are encoded S140 into a second set of frames of the extended layer using a higher resolution than the base layer resolution or a lower compression level than the base layer compression level.

The method 100 uses scalable coding where encoded frames of the base layer which uses the base layer resolution and the base layer compression level are supplemented with encoded frames of the extended layer which uses the higher resolution than the base layer resolution or the lower compression level than the base layer compression level. Using higher resolution means that a frame of the extended layer includes information such that combined with a corresponding frame of the base layer, an image with higher resolution can be decoded at a decoder than the base resolution of the frame of the base layer. Using lower compression level means that a frame of the extended layer includes information such that combined with a corresponding frame of the base layer, an image with lower compression can be decoded at a decoder than the base compression level of the frame of the base layer. Compression level may for example be set in terms of a quantization parameter. Examples of such scalable coding are known, such as in AV1 and the extension Scalable High efficiency Video Coding (SHVC) to the video coding standard HEVC/H.265. A novel aspect of the herein disclosed method is to encode images of a sequence of video images relating to respective times before detecting an event trigger into empty frames of the extended layer irrespective of the encoding of the corresponding images in the base layer.

The empty frames of the extended layer are encoded frames which include little or no additional information to the information provided in a corresponding encoded frame of the base layer. By having little or preferably no additional information to the corresponding encoded frames of the base layer, empty frames of the extended layer will require little or minimal number of bits. For example, empty frames of the extended layer, such as the first set of frames, may be frames which have been encoded using skip blocks for a majority of blocks of each of the frames. In an alternative, empty frames of the extended layer, such as the first set of frames, may be frames which have been encoded using skip blocks for all of blocks of each of the frames.

A skip block is a block for which no image information is sent to the decoder; only an indication that the block is a skip block. A block here is used to denote a group of pixels processed together during encoding. Blocks may also be denoted macroblocks, or coding tree units depending on the encoding format used. The term for such blocks may also differ between encoding formats and in some encoding formats, a complete frame may be indicated to include no image information. For example, a complete frame may be indicated as a repeat-frame which indicates that a previous frame should be repeated. In relation to the method 100 of FIG. 1, the first set of frames encoded as repeat-frames would be indicated to a decoder to include no further image information to the corresponding frames of the base layer. Such indication to a decoder that the first set of frames are repeat-frames may be signalled in a header, i.e. not necessarily by transmitting frames including the indication. Such repeat-frames are for example used in AV1 and the feature is denoted "show_existing_frame".

The event trigger may be a number of different things that indicates that an event is occurring or is about to occur which may become of interest and hence, that the sequence of video images captured after the event trigger may include information that will be of more interest than the sequence of video images captured before the event trigger. For example, the event trigger may be based on audio analysis identifying a gun shot, window smashing etc. The event trigger may also simply relate any sound identified when no sound is expected, such a sound in a building which is expected to be empty. The event trigger may also be based on image analysis identifying a movement when no movement is expected, such a movement in a building which is expected to be empty. Such movement may also be detected by means of a movement sensor. Other event triggers may be opening of a door or a window. The event trigger may also be an active indication by person, such as a person using a body worn camera capturing video images to be encoded. For example, the person wearing the body worn camera may indicate by pressing of a button or using any other suitable interface that an event trigger is detected.

Encoding of an empty frame of the extended layer sometimes occur also in known methods due to the encoding of the corresponding frame of the base layer. For example, if a frame of the base layer itself is encoded as an empty frame, the corresponding frame of the extended layer cannot enhance the base layer frame and will consequently be encoded as an empty frame. According to the method 100, the video images of the sequence of video images corresponding to respective times before detecting the event trigger are encoded S120 into the first set of frames of the extended layer wherein the frames of the first set of frames are empty frames irrespective of the encoding of the corresponding frames of the base layer. Hence, regardless of the encoding of the corresponding frames of the base layer, the first set of frames are encoded as empty frames. Specifically, the first set of frames are encoded as empty frames regardless if the corresponding frames of the base layer are encoded as non-empty frames. This will result in a reduced bit rate of the single video stream in relation to if the first set of frames were to be encoded dependent of the corresponding base layer frames, since they would then be encoded as non-empty frames if the corresponding base layer frames were non-empty frames. A bitrate reduction is achieved for every frame of the extended layer encoded as an empty frame when the corresponding frame of the base layer is encoded as a non-empty frame. The bitrate reduction will be higher depending on the portion of the frames of the extended layer that are encoded as empty frames when the corresponding frame of the base layer is encoded as a non-empty frame. Hence, even if some of the frames of the extended layer corresponding to times before the event trigger is detected are encoded non-empty frames, there will be a bitrate reduction as long as some of the frames of the extended layer are encoded as empty frames when the corresponding frame of the base layer is encoded as a non-empty frame.

According to the method 100, the video images of the sequence of video images corresponding to respective times after detecting the event trigger are encoded S140 into the second set of frames of the extended layer using a higher resolution than the base layer resolution or a lower compression level than the base layer compression level. The method 100 is mainly aimed at reducing bitrate before the event trigger is detected. After the event trigger has been detected S130, the frames of the extended layer should preferably be used to enhance the encoded video stream. This is because the event trigger indicates that an event is occurring or is about to occur which may become of interest and hence, that the sequence of video images captured after the event trigger may include information that will be of more interest than the sequence of video images captured before the event trigger. Hence, after the event trigger has been detected S130, a frame of the extended layer should preferably not be encoded as an empty frame unless the corresponding frame of the base layer is encoded as an empty frame.

The method may be combined with use of a pre-buffer. In the pre-buffer, frames corresponding to a predetermined time are stored temporarily in a first in first out manner. Here, frames of the extended layer using a higher resolution than the base layer resolution or a lower compression level than the base layer compression level may be encoded also before the detection of the event trigger and stored in the pre-buffer. This is done in parallel with encoding frames of the extended layer as empty frames irrespective of the encoding of the corresponding frames of the base layer before the detection of the event trigger. The frames of the pre-buffer are not used for permanent storage or transmission unless an event trigger is detected within the preterminal time corresponding to the size of the pre-buffer. Hence, if no event trigger is detected within the preterminal time corresponding to the size of the pre-buffer from encoding a frame and storing it in the pre-buffer, the frame will be discarded. However, if an event trigger is detected within the predetermined time corresponding to the size of the pre-buffer from encoding the frame, the frame will be used for transmission or storing permanently. This enables inclusion in transmission or permanent storing of frames with the higher resolution than the base layer resolution or the lower compression level encoded the predetermined time before detecting the event trigger. Hence, at detection of the event trigger, all frames, or some of them, currently in the pre-buffer may be used for permanent storage or transmission.

Figure 2:
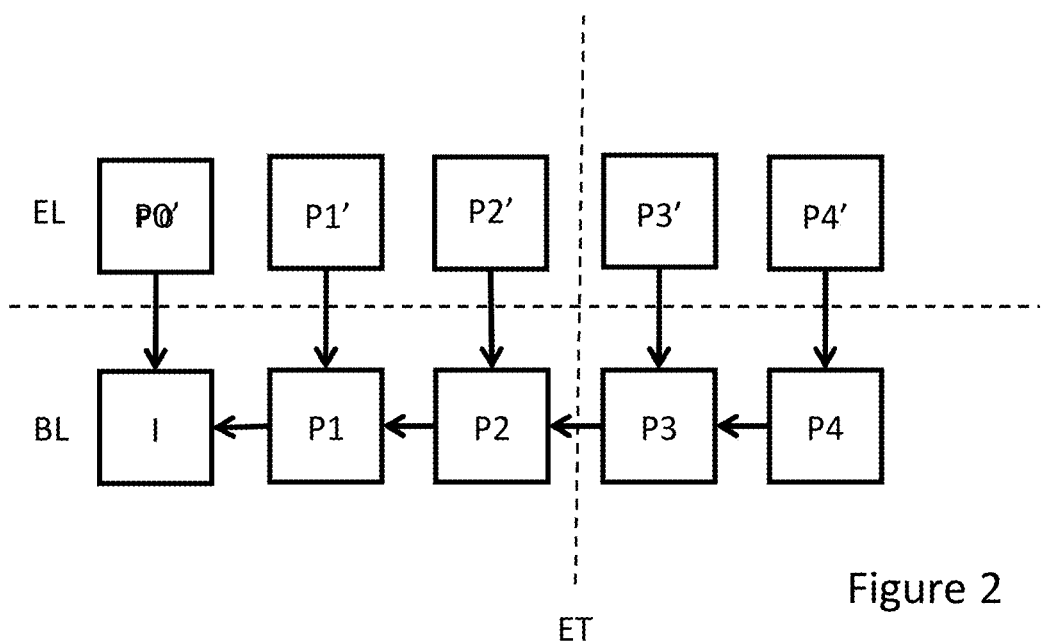
FIG. 2 is a flow chart of embodiments of a method of transmitting a sequence of video images with dynamic bitrate.

Turning to FIG. 2 which shows a scalable encoding structure with layers in the form of a base layer BL including an encoded frames I, P1, P2, P3, P4 and an extended layer EL including encoded frames P0', P1', P2', P3', P4'. The encoded frames of the base layer BL include an intra frame I and four inter frames P1, P2, P3, P4. The encoded frames of the extended layer EL includes five inter frames P0', P1', P2', P3', P4'. The base layer includes frames I, P1, P2, P3, P4 using a base layer resolution and base layer quality level. The extended layer EL frames P0', P1', P2', P3', P4' together with the encoded frames I, P1, P2, P3, P4 of the base layer BL form an enhanced encoded video stream which at a decoder side may be decoded into an enhanced decoded video stream. The encoded frames P0', P1', P2', P3', P4' of the extended layer EL may use different ways of enhancing the encoded video stream. The frames P0', P1', P2', P3', P4' of the extended layer EL may use a higher resolution than the base layer resolution or they may use a lower compression level. The encoded frames I, P1, P2, P3, P4 of the base layer BL are independent of the encoded frames P0', P1', P2', P3', P4' of the extended layer EL. At a decoder side, the base layer BL frames I, P1, P2, P3, P4 may be decoded into decoded frames separately from the frames of the extended layer P0', P1', P2', P3', P4'. The encoded frames P0', P1', P2', P3', P4' of the extended layer EL depend on the encoded frames I, P1, P2, P3, P4 of the base layer BL.

In relation to the sequence of video images encoded by means of the method described in relation to FIG. 1, an event trigger ET may for example have been detected between the third encoded frame P2' and fourth frame P3' in the extended layer EL as indicated in FIG. 2. The first three encoded frames P0', P1', P2' of the extended layer EL relating to times before the event trigger ET was detected would then have been encoded as empty frames, and the last two encoded frames P3', P4' of the extended layer EL relating to times after the event trigger ET was detected would then have been encoded using a higher resolution than the base layer resolution or a lower compression level than the base layer compression level.

The number of interframes shown in FIG. 2 is only for purpose of illustration. The number of encoded frames between intra frames may be set to any suitable number.

In alternative to the frames of the extended layer EL being encoded as P-frames they may also be encoded as B-frames.

Although in FIG. 2, two layers in the form of the base layer and the extended layer are illustrated, one or more further layers may be added, such as for example adding a further extended layer such that there is a first extended layer and a second extended layer. For example, the encoding may be adapted not only in relation to before an event but also different importance of the event. Before any detection of an event trigger, images are encoded as empty frames in both of the first and second extended layers. After detecting an event trigger in relation to a low importance event, the images are encoded as empty frames in the second extended layer and frames having a higher resolution or lower compression level in the first extended layer. After detecting an event trigger in relation to a high importance event, the images are encoded as frames having a higher resolution or lower compression level in both of the first and second extended layers. Alternatively, for more than two further extended layers, the bitrate may be decreased stepwise by introducing empty frames in more of the extended layers. This may be done based on a current determined need for details in the encoded video stream.

Figure 3:
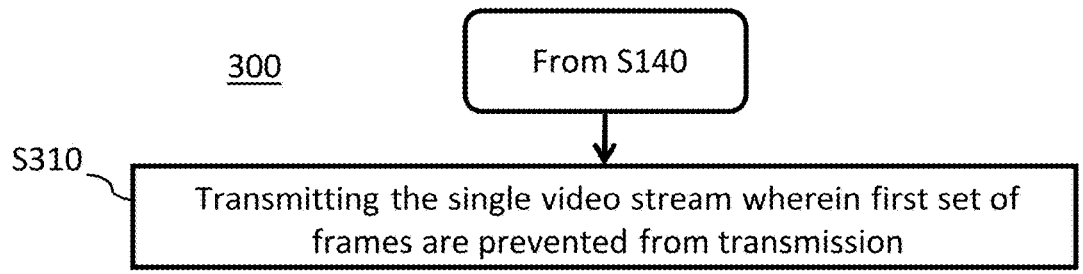
FIG. 3 is a flow chart of embodiments of a method for encoding a sequence of video images into a single video stream with dynamic bitrate.

FIG. 3 is a flow chart of embodiments of a method 300 of transmitting a sequence of video images with dynamic bitrate. The sequence of video images have first been encoded into a single video stream in accordance with the method 100 described in relation to FIG. 1. The single video stream is then transmitted S310 wherein the first set of frames, which are empty frames encoded from images corresponding to respective times before the enent trigger is detected, are prevented from transmission. The second set of frames, which are frames encoded from images corresponding to respective times after detecting the event trigger, on the other hand are typically transmitted. The frames of the base layer are also typically transmitted.

In other words, even if the two different layers are encoded into one video stream, when the encoded video stream is to be transmitted, selection can be made of two transmission modes. In a first transmission mode, the encoded frames of the extended layer are prevented from transmission and only the encoded frames of the base layer of the encoded video stream is transmitted, and in a second transmission mode both the encoded frames of the base layer and the encoded frames of the extended layer of the encoded video stream are transmitted. The first transmission mode is then used before the event trigger is detected and the second transmission mode is used after the event is detected.

Figure 4:
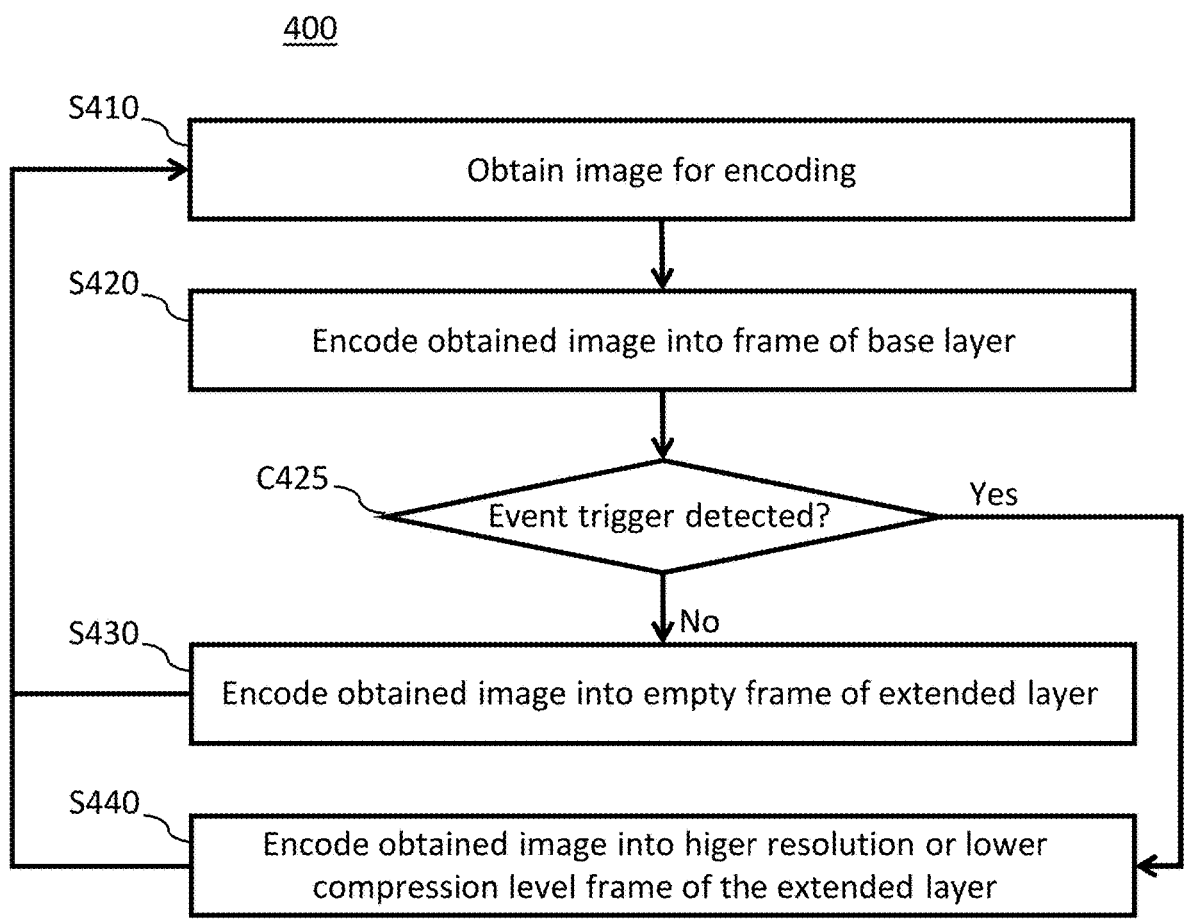
FIG. 4 is a schematic block diagram of a layered structure of an encoded video stream.

FIG. 4 is a flow chart of embodiments of a method 400 of encoding a sequence of video images into a single video stream with dynamic bitrate. An image for encoding is obtained S410, e.g. by receiving the image from an image sensor. The obtained frame is then encoded S420 into a frame of the base layer having a base layer resolution and a base layer compression level. If C425 an event trigger has not been detected, the obtained image is encoded S440 into an empty frame of the extended layer irrespective of the encoding of the frame in the base layer and the method 400 is continued by obtaining S410 a further image for encoding. If C425 the event trigger has been detected, the obtained image is encoded S430 into a frame of the extended layer using a higher resolution than the base layer resolution or a lower compression level than the base layer compression level, and the method 400 is continued by obtaining S410 the further image for encoding. Once the event trigger has been detected, frames received after the detection will be encoded S430 into frames of the extended layer using a higher resolution than the base layer resolution or a lower compression level than the base layer compression level until a reset of the condition, i.e. causing the condition that the event trigger is detected to become untrue. This may be done manually, after a predetermined period of time or by means of a detection of an end of the event or any other suitable way. The aim is to keep encoding images into frames of the extended layer using a higher resolution than the base layer resolution or a lower compression level than the base layer compression level until a reset of the condition or as long as the event is occurring.

Figure 5:
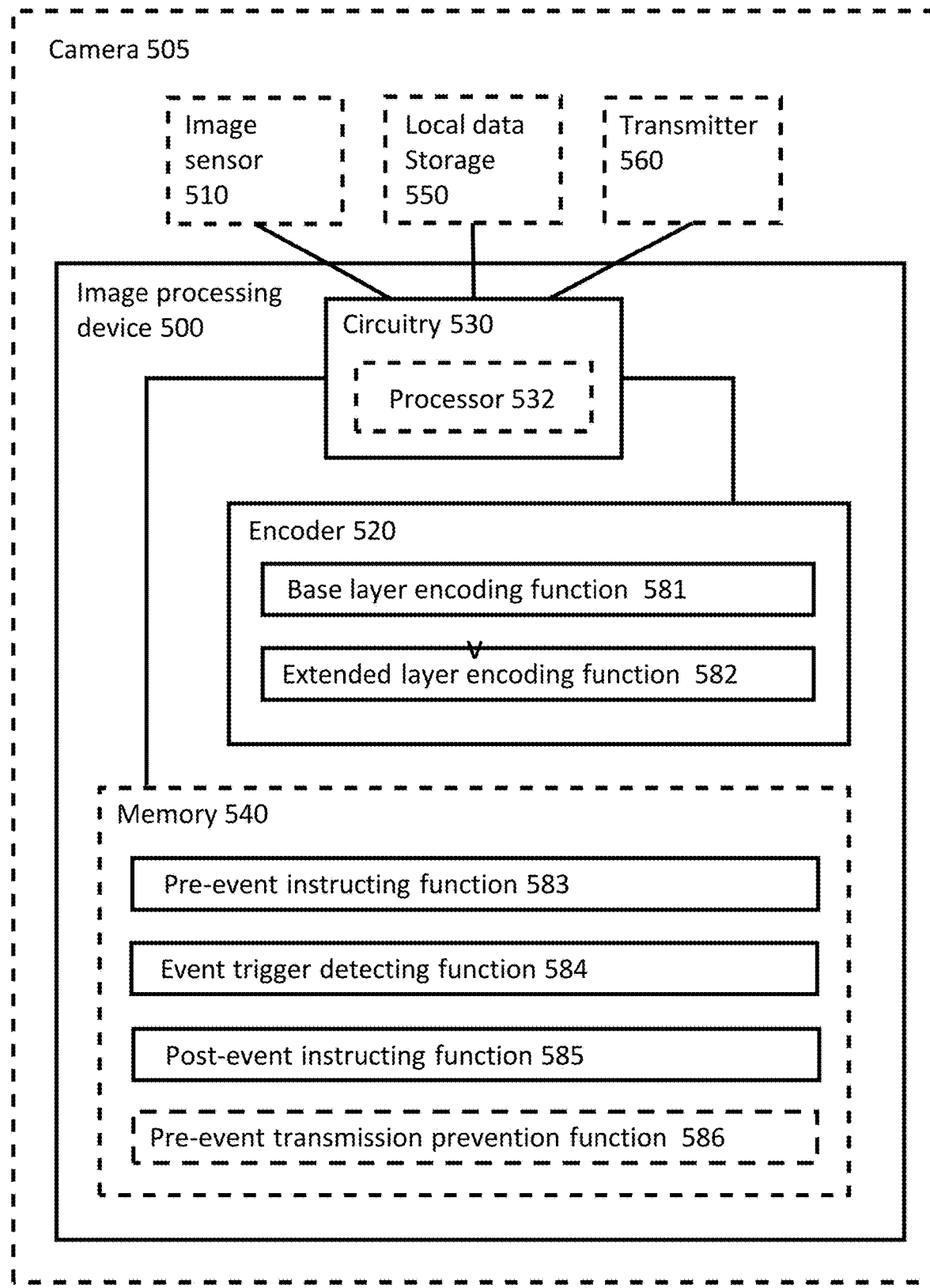
FIG. 5 is a schematic block diagram of an image processing device included in a camera.

FIG. 5 illustrates embodiments of an image processing device 500 according to the present disclosure in relation to a camera 505 comprising an image sensor 510 configured to capture image data. The camera 505 may be a body worn camera, BWC, or another moveable camera or it may be a fixed camera, e.g. a monitoring camera or surveillance camera. The camera 505 may be a separate unit or it may be integrated in another unit, such as in a helmet, glasses etc. The camera 505 may be used, e.g., by police officers, for capturing video and possibly other data during patrols and incidents or it may be used for monitoring an area. Captured data may subsequently be needed as evidence, for example when investigating crimes and prosecuting persons suspected for the crimes. In order to preserve the captured data, a data management system external from the camera 505, such as a video management system or an evidence management system, may be used. Such data management systems generally provide storage of captured data, and also viewing of the captured data, either in real time or as a playback of recorded data. The camera 505 may be subject to bitrate limitations, e.g. due to limited data storage and/or limitations in bandwidth for a connection to the data management system or to a central where a live feed is viewed. Furthermore, the limitation in bandwidth for the connection may vary over time such that the bitrate occasionally becomes even more limited.

The image processing device comprises an encoder 520, and circuitry 530. The image sensor 510 is configured to capture image data. The image data may, e.g., be data of image frames. Image sensors and capturing of image data are well known for the person skilled in the art and will not be discussed in any more detail in this disclosure.

The encoder 520 is configured to encode images, e.g. captured by the image sensor 510 of the camera 505, into a video stream, sometimes the video stream provided by the encoder 520 is referred to as an encoded video stream. Typically, the video encoder 520 is configured to encode some of the images of the video stream as intra frames or key frames and some of the images of the video stream as inter frames or delta frames. An intra frame is an encoded video frame that does not require information from other encoded video frames to be decoded. Hence, an intra frame is encoded based on information from the image frame of video data it is set to correspond to. Typically, similarities within the image frame are used to encode the image into an intra frame. In video encoding an intra frame is often referred to as an I-frame. The images of the video stream in between two intra frames are encoded as inter frames. Typically, an inter frame only comprises changes that occur from one frame to the next. Hence, inter frames are typically comprising less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame. When encoding an image into an inter frame, the image is divided into multiple groups of pixels. The groups of pixels may for example be referred to as blocks, macroblocks, or coding tree units. The image is compared to a reference image. For example, the reference image for encoding a P-frame is a previous image. A matching algorithm is used to identify matching groups of pixels between the image frame to be encoded and the reference frame and if a match is found for a group of pixels, that group of pixels may be encoded as a motion vector specifying how the group of pixels has moved in the image frame since the reference frame. Determining motion vectors is sometimes referred to as motion estimation. If the movement is large due to fast movement of the camera or of objects in the captured scene, the motion estimation may fail in identifying motion vectors. The fewer motion vectors identified for an image frame to be encoded, the larger the resulting encoded inter frame will become in bit size and hence, the larger the contribution to the bitrate of the encoded video stream.

The encoder 520 is configured to execute a base layer encoding function 581 and an extended layer encoding function 582. The base layer encoding function 581 is configured to encode the sequence of video images into frames of a base layer of the single video stream using a base layer resolution and a base compression level. The extended layer encoding function 582 is configured to encode the sequence of video images into frames of an extended layer of the single video stream.

The circuitry 530 is configured to carry out functions of the image processing device 500. The circuitry 530 may include a processor 532, such as a central processing unit (CPU), microcontroller, or microprocessor. The processor 532 is configured to execute program code. The program code may for example be configured to carry out the functions of the wearable camera 505.

The image processing device 500 may further comprise a memory 540. The memory 540 may be one or more of a buffer, a flash memory, a hard drive, a removable media, a volatile memory, a non-volatile memory, a random access memory (RAM), or another suitable device. In a typical arrangement, the memory 540 may include a non-volatile memory for long term data storage and a volatile memory that functions as system memory for the circuitry 530. The memory 540 may exchange data with the camera circuitry 530 over a data bus. Accompanying control lines and an address bus between the memory 540 and the circuitry 530 also may be present.

Functions of the image processing device 500 may be embodied in the form of executable logic routines (e.g., lines of code, software programs, etc.) that are stored on a non-transitory computer readable medium (e.g., the memory 540) of the camera 505 and are executed by the camera circuitry 530 (e.g., using the processor 532). Furthermore, the functions of the image processing device 500 may be a stand-alone software application or form a part of a software application that carries out additional tasks related to the camera 505. The described functions may be considered a method that a processing unit, e.g. the processor 532 of the circuitry 530 is configured to carry out. Also, while the described functions may be implemented in software, such functionality may as well be carried out via dedicated hardware or firmware, or some combination of hardware, firmware and/or software.

The circuitry 530 is configured to execute a pre-event instructing function 583, an event trigger detecting function 584, and a post-event instructing function 585. The pre-event instructing function 583 is configured to instruct the encoder to encode video images of the sequence of video images corresponding to respective times before detecting an event trigger into a first set of frames of the extended layer of the single video stream, wherein the frames of the first set of frames are empty frames irrespective of the encoding of the corresponding frames of the base layer. The event trigger detecting function 584 is configured to detect the event trigger. The post-event instructing function 585 is configured to, upon detecting the event trigger, instruct the encoder to encode video images of the sequence of video images corresponding to respective times after detecting the event trigger into a second set of frames of the extended layer using a higher resolution than the base layer resolution or a lower compression level than the base layer compression level.

The camera 505 may further comprise a local data storage 550. The local data storage 550 may be configured to store the video stream. The local data storage typically has a limited data storage capacity. The local data storage 550 may be any type of local data storage suitable for storage of a video stream. For example, the local data storage 550 may be in the form of an SD card reader and an SD card. Another example of a local data storage 540 may be in the form of a flash memory, e.g., a NAND flash.

The camera 505 may further comprise a transmitter 560. The transmitter 560 may be configured to transmit, e.g. wirelessly, the video stream, e.g. to the data management system. The transmitter 560 may be configured to continuously transfer the captured video stream to the video management system. The transfer is typically limited due to bandwidth available for the transfer. The bandwidth available for transfer may also vary over time.

The circuitry 530 may be further configured to execute a pre-event transmission prevention function 586. The pre-event transmission prevention function 586 configured to prevent the transmitter from transmitting the first set of frames.

The functions carried out by the encoder 520 and the circuitry 530 may be further adapted as the corresponding steps of the method 100 described in relation to FIG. 1, the method 300 described in relation to FIG. 3, and the method 400 described in relation to FIG. 4.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method of encoding a sequence of video images into a single video stream with dynamic bitrate, the method comprising:
    encoding the sequence of video images into frames of a base layer of the single video stream using a base layer resolution and a base layer compression level;
    encoding video images of the sequence of video images corresponding to respective times before detecting an event trigger into a first set of frames of an extended layer of the single video stream, wherein the first set of frames are empty frames irrespective of the encoding of the corresponding frames of the base layer, wherein the empty frames are frames which have been encoded using skip blocks for all blocks of each of the frames, and wherein the event trigger indicates that an event is occurring or is about to occur which may become of interest and that video images of the sequence of video images corresponding to respective times after the event trigger may include information that will be of more interest than the video images of the sequence of video images corresponding to respective times before the event trigger;
    detecting the event trigger; and
    upon detecting the event trigger, encoding the video images of the sequence of video images corresponding to respective times after detecting the event trigger into a second set of frames of the extended layer of the single video stream using a higher resolution than the base layer resolution or a lower compression level than the base layer compression level.

2. The method of claim 1, wherein the frames of the second set of frames of the extended layer are inter frames encoded using prediction dependent on corresponding frames of the base layer.

3. A method of transmitting a sequence of video images with dynamic bitrate comprising:
    encoding the sequence of video images according to the method of claim 1;
    transmitting the frames of the base layer and the second set of frames of the extended layer of the single video stream, wherein the first set of frames are prevented from being transmitted.

4. A non-transitory computer readable storage medium having stored thereon instructions for implementing the method according to claim 1, when executed on a device having processing capabilities.

5. An image processing device for encoding a sequence of video images into a single video stream with dynamic bitrate, the image processing device comprising:
    an encoder configured to execute:
    a base layer encoding function configured to encode the sequence of video images into frames of a base layer of the single video stream using a base layer resolution and a base compression level;
    an extended layer encoding function configured to encode the sequence of video images into frames of an extended layer of the single video stream;
    circuitry configured to execute:
    a pre-event instructing function configured to instruct the encoder to encode video images of the sequence of video images corresponding to respective times before detecting an event trigger into a first set of frames of the extended layer of the single video stream, wherein the first set of frames are empty frames irrespective of the encoding of the corresponding frames of the base layer, wherein the empty frames are frames which have been encoded using skip blocks for all blocks of each of the frames, and wherein the event trigger indicates that an event is occurring or is about to occur which may become of interest and that video images of the sequence of video images corresponding to respective times after the event trigger may include information that will be of more interest than the video images of the sequence of video images corresponding to respective times before the event trigger;
    an event trigger detecting function configured to detect the event trigger; and
    a post-event instructing function configured to, upon detecting the event trigger, instruct the encoder to encode the video images of the sequence of video images corresponding to respective times after detecting the event trigger into a second set of frames of the extended layer of the single video stream using a higher resolution than the base layer resolution or a lower compression level than the base layer compression level.

6. The image processing device of claim 5, wherein the frames of the second set of frames of the extended layer are inter frames encoded using prediction dependent on corresponding frames of the base layer.

7. A camera comprising the image processing device of claim 5.

8. The camera of claim 7, further comprising a transmitter configured to transmit the frames of the base layer and the second set of frames of the extended layer of the single video stream;
    wherein the circuitry of the image processing device is further configured to execute:
    pre-event transmission prevention function configured to prevent the transmitter from transmitting the first set of frames.

* * * * *